(12) United States Patent
Hurley et al.

(10) Patent No.: US 9,405,084 B2
(45) Date of Patent: *Aug. 2, 2016

(54) MULTI-FIBER, FIBER OPTIC CABLE ASSEMBLIES PROVIDING CONSTRAINED OPTICAL FIBERS WITHIN AN OPTICAL FIBER SUB-UNIT, AND RELATED FIBER OPTIC COMPONENTS, CABLES, AND METHODS

(71) Applicant: CORNING OPTICAL COMMUNICATIONS LLC, Hickory, NC (US)

(72) Inventors: William Carl Hurley, Hickory, NC (US); Wesley Allan Yates, Lenoir, NC (US)

(73) Assignee: CORNING OPTICAL COMMUNICATIONS LLC, Hickory, NC (US)

( * ) Notice: Subject to any disclaimer, the term of this patent is extended or adjusted under 35 U.S.C. 154(b) by 7 days.

This patent is subject to a terminal disclaimer.

(21) Appl. No.: 14/494,851

(22) Filed: Sep. 24, 2014

(65) Prior Publication Data
US 2015/0010283 A1    Jan. 8, 2015

Related U.S. Application Data

(63) Continuation of application No. 13/165,974, filed on Jun. 22, 2011, now Pat. No. 8,953,916.

(51) Int. Cl.
G02B 6/44    (2006.01)
G02B 6/46    (2006.01)

(52) U.S. Cl.
CPC .............. *G02B 6/441* (2013.01); *G02B 6/443* (2013.01); *G02B 6/4472* (2013.01); *G02B 6/4486* (2013.01); *G02B 6/46* (2013.01); *G02B 6/4434* (2013.01); *Y10T 29/49117* (2015.01); *Y10T 29/49826* (2015.01)

(58) Field of Classification Search
None
See application file for complete search history.

(56) References Cited

U.S. PATENT DOCUMENTS

| | | | |
|---|---|---|---|
| 2,434,793 A | 1/1948 | Feaster | 174/113 |
| 4,787,702 A | 11/1988 | Khalil | 350/96.23 |
| 4,822,134 A | 4/1989 | Campbell | 350/96.23 |
| 5,163,116 A | 11/1992 | Oestreich et al. | 385/111 |
| 6,374,023 B1 | 4/2002 | Parris | 385/109 |
| 6,389,214 B1 | 5/2002 | Smith et al. | 385/136 |

(Continued)

FOREIGN PATENT DOCUMENTS

GB    2472014 A    1/2011    ............ G02B 6/44

*Primary Examiner* — Tina Wong

(57) ABSTRACT

Multi-fiber, fiber optic cable assemblies and related fiber optic components, cables, and methods providing constrained optical fibers within an optical fiber sub-unit are disclosed. The optical fiber sub-unit(s) comprises optical fibers disposed adjacent a sub-unit strength member(s) within a sub-unit jacket. Movement of optical fibers within a sub-unit jacket can be constrained. In this manner, the optical fibers in an optical fiber sub-unit can be held together within the optical fiber sub-unit as a unit. As a non-limiting example, the optical fiber sub-unit(s) may be exposed and constrained in a furcation assembly as opposed to the optical fibers, thereby reducing complexity in fiber optic cable assembly preparations. Constraining the optical fibers may also allow optical skew, reduction of entanglement between the optical fibers and the cable strength members to reduce or avoid optical attenuation, and/or allow the optical fibers to act as anti-buckling components within the fiber optic cable.

15 Claims, 11 Drawing Sheets

(56) References Cited

U.S. PATENT DOCUMENTS

| | | | |
|---|---|---|---|
| 6,764,221 B1 | 7/2004 | De Jong et al. | 385/55 |
| 7,537,393 B2 | 5/2009 | Anderson et al. | 385/54 |
| 7,742,667 B2 | 6/2010 | Paschal et al. | 385/109 |
| 7,758,258 B2 | 7/2010 | Seita | 396/357 |
| 8,953,916 B2 * | 2/2015 | Hurley | G02B 6/4472 385/106 |
| 2003/0059181 A1 | 3/2003 | Jackman et al. | 385/102 |
| 2010/0098386 A1 | 4/2010 | Kleeberger | 385/100 |
| 2012/0301090 A1 | 11/2012 | Cline et al. | 385/103 |

* cited by examiner

MULTI-FIBER, FIBER OPTIC CABLE ASSEMBLIES PROVIDING CONSTRAINED OPTICAL FIBERS WITHIN AN OPTICAL FIBER SUB-UNIT, AND RELATED FIBER OPTIC COMPONENTS, CABLES, AND METHODS

PRIORITY APPLICATION

This is a continuation of U.S. patent application Ser. No. 13/165,974, filed on Jun. 22, 2011, the content of which is relied upon and incorporated herein by reference in its entirety, and the benefit of priority under 35 U.S.C. §120 is hereby claimed.

BACKGROUND

1. Field of the Disclosure

The technology of the disclosure relates to multi-fiber, fiber optic cables, and related fiber optic components and assemblies.

2. Technical Background

Benefits of optical fiber use include extremely wide bandwidth and low noise operation. Because of these advantages, optical fiber is increasingly being used for a variety of applications, including but not limited to broadband voice, video, and data transmission. As a result, fiber optic communications networks include a number of interconnection points at which multiple optical fibers are interconnected. Fiber optic communications networks also include a number of connection terminals, examples of which include, but are not limited to, network access point (NAP) enclosures, aerial closures, below grade closures, pedestals, optical network terminals (ONTs), and network interface devices (NIDs). In certain instances, the connection terminals include connector ports, typically opening through an external wall of the connection terminal. The connection terminals are used to establish optical connections between optical fibers terminated from the distribution cable and respective optical fibers of one or more pre-connectorized drop cables, extended distribution cables, tether cables or branch cables, collectively referred to herein as "drop cables." The connection terminals are used to readily extend fiber optic communications services to a subscriber. In this regard, fiber optic networks are being developed that deliver "fiber-to-the-curb" (FTTC), "fiber-to-the-business" (FTTB), "fiber-to-the-home" (FTTH) and "fiber-to-the-premises" (FTTP), referred to generically as "FTTx."

Use of multi-fiber distribution cables in a fiber optic communications network can present certain challenges. For example, excessive optical skew or delay can cause transmission errors. Optical fibers in multi-fiber distribution cables can be damaged if the cable is subject to excessive bending. To prevent or reduce excessive bending, cable strength members may be disposed within a cable jacket of the fiber optic cable along with the optical fibers. However, the optical fibers may engage and become entangled with the strength members thereby bending the optical fibers inside the cable jacket and attenuating the optical signals carried on the optical fibers. Further, a terminated end of the distribution cable often times must be pulled to a desired location during installation, such as to a connection terminal (e.g., a fiber distribution hub (FDH)) or to another distribution cable, through relatively small diameter conduits. Accordingly, a terminated end of the distribution cable can be provided within a pulling grip. When pulled, the pulling grip is capable of transferring a tensile load (e.g., a pulling load) to the cable jacket and/or strength members of the fiber optic cable. However, a portion of the pulling load may be transferred to the optical fibers within the fiber optic cable. Transferring excessive load to optical fibers disposed in a fiber optic cable can damage the optical fibers.

SUMMARY

Embodiments disclosed in the detailed description include multi-fiber, fiber optic cables providing constrained optical fibers within an optical fiber sub-unit disposed in a cable jacket. Related fiber optic components and fiber optic assemblies are also disclosed. In one embodiment, one or more optical fiber sub-units can be provided that each comprises a plurality of optical fibers disposed adjacent one or more sub-unit strength members within a sub-unit jacket. Movement of optical fibers within a sub-unit jacket is constrained by an interior wall of the sub-unit jacket and/or the sub-unit strength members disposed in the sub-unit jacket. In this manner as a non-limiting example, optical fibers disposed in an optical fiber sub-unit can be held together as a unit within the optical fiber sub-unit. By providing the optical fibers constrained as a unit in optical fiber sub-units, the optical fiber sub-units may be constrained in a furcation assembly without having to expose the optical fibers within the optical fiber sub-units, thereby reducing complexity in fiber optic cable assembly preparations. Avoiding exposing optical fibers in a furcation assembly may also reduce the risk of damaging the optical fibers during furcation assembly preparations. Constraining the optical fibers within the optical fiber sub-units may also, as non-limiting examples, provide low optical skew, may reduce or eliminate entanglement between the optical fibers and the cable strength members to reduce or avoid optical attenuation, and/or may allow the optical fibers to act as anti-buckling components within the fiber optic cable.

As one non-limiting option, the optical fiber sub-units may be disposed adjacent to the cable strength members within the cable jacket in a manner that allows movement between the optical fiber sub-units and the cable strength members within the cable jacket. In this manner, the one or more optical fiber sub-units can freely move within the cable jacket in this embodiment. As a result in one non-limiting example, entanglements between the cable strength member and the optical fiber sub-units that may cause optical attenuation or broken fibers may be avoided. Stranding can cause a bend to be disposed in the optical fiber sub-units thereby attenuating optical signals carried by the optical fibers in the optical fiber sub-units.

In this regard in one embodiment, a fiber optic cable assembly is disclosed. This fiber optic cable assembly comprises a fiber optic cable comprising a cable jacket, one or more cable strength members disposed within the cable jacket, and one or more optical fiber sub-units disposed within the cable jacket. This fiber optic cable assembly also comprises an end portion of the fiber optic cable comprising end portions of optical fiber sub-units and end portions of the cable strength members both exposed from an end portion of the cable jacket. This fiber optic cable assembly also comprises a furcation assembly receiving the end portion of the fiber optic cable at a first end of the furcation assembly. The furcation assembly terminates the end portion of the cable jacket and the end portions of the cable strength members. The end portions of the optical fiber sub-units extending through and from a second end of the furcation assembly. Additionally, each of the optical fiber sub-units may comprise a plurality of optical fibers and one or more sub-unit strength members disposed adjacent to each other in a sub-unit jacket. In this regard, movement of the optical fibers within the sub-unit jacket is constrained by an interior wall of the sub-unit jacket and the sub-unit strength members.

In this embodiment, the one or more cable strength members are disposed within the cable jacket in a first length, and the one or more optical fiber sub-units are disposed within the cable jacket in a second length, the second length greater than the first length. In this manner as a non-limiting example, a tensile load (e.g., a pulling load) placed on the furcation assembly is directed more to the one or more cable strength members to avoid or reduce stress placed on the optical fibers. As a non-limiting option in this embodiment, the optical fiber sub-units are disposed adjacent to the cable strength members within the cable jacket that allows movement between the one or more optical fiber sub-units and the one or more cable strength members within the cable jacket. As another non-limiting example, the optical fiber sub-units can include tight buffered optical fibers that are disposed adjacent to strength members disposed within the sub-unit jackets, wherein movement between is allowed between the optical fiber sub-units and the one or more cable strength members within the cable jacket of the fiber optic cable.

In another embodiment, a method of assembling a fiber optic cable is disclosed. This method comprises disposing one or more cable strength members within a cable jacket of a fiber optic cable in a first length. This method also comprises disposing one or more optical fiber sub-units within the cable jacket in a second length, the second length greater than the first length, and each optical fiber sub-unit including a sub-unit jacket and a plurality of optical fibers disposed within the sub-unit jacket. This method also comprises exposing end portions of the one or more optical fiber sub-units and end portions of the one or more cable strength members from an end portion of the cable jacket. This method also comprises receiving the end portion of the fiber optic cable at a first end of a furcation assembly. This method also comprises terminating the end portion of the cable jacket and the end portions of the one or more cable strength members in the furcation assembly.

In another embodiment, a fiber optic cable is disclosed. This fiber optic cable comprises a cable jacket. This fiber optic cable also comprises one or more cable strength members disposed within the cable jacket in a first length. This fiber optic cable also comprises one or more optical fiber sub-units disposed within the cable jacket in a second length, the second length greater than the first length. Each of the optical fiber sub-units comprises a plurality of optical fibers and one or more sub-unit strength members disposed adjacent to each other in a sub-unit jacket. In this regard, movement of the optical fibers within the sub-unit jacket is radially constrained by an interior wall of the sub-unit jacket and the sub-unit strength members, and the plurality of optical fibers are in friction contact with the one or more sub-unit strength members constraining relative longitudinal movement of the plurality of optical fibers within the sub-unit jacket. The optical fiber sub-units are disposed adjacent to the cable strength members within the cable jacket. The one or more optical fiber sub-units are disposed within the cable jacket adjacent to the one or more cable strength members to allow movement between the one or more optical fiber sub-units and the one or more cable strength members within the cable.

In any of the embodiments disclosed herein, the optical fiber sub-units can be tight buffered optical fibers without the inclusion of strength members provided within the optical fiber-subunit(s), if desired.

Additional features and advantages will be set forth in the detailed description which follows, and in part will be readily apparent to those skilled in the art from that description or recognized by practicing the embodiments as described herein, including the detailed description that follows, the claims, as well as the appended drawings.

It is to be understood that both the foregoing general description and the following detailed description present embodiments, and are intended to provide an overview or framework for understanding the nature and character of the disclosure. The accompanying drawings are included to provide a further understanding, and are incorporated into and constitute a part of this specification. The drawings illustrate various embodiments, and together with the description serve to explain the principles and operation of the concepts disclosed.

DETAILED DESCRIPTION

Reference will now be made in detail to the embodiments, examples of which are illustrated in the accompanying drawings, in which some, but not all embodiments are shown. Indeed, the concepts may be embodied in many different forms and should not be construed as limiting herein; rather, these embodiments are provided so that this disclosure will satisfy applicable legal requirements. Whenever possible, like reference numbers will be used to refer to like components or parts.

Embodiments disclosed in the detailed description include multi-fiber, fiber optic cables providing constrained optical fibers within an optical fiber sub-unit disposed in a cable jacket. Related fiber optic components and fiber optic assemblies are also disclosed. In one embodiment, one or more optical fiber sub-units can be provided that each comprises a plurality of optical fibers disposed adjacent one or more sub-unit strength members within a sub-unit jacket. Movement of optical fibers within a sub-unit jacket is constrained by an interior wall of the sub-unit jacket and/or the sub-unit strength members disposed in the sub-unit jacket. In this manner as a non-limiting example, optical fibers disposed in an optical fiber sub-unit can be held together as a unit within the optical fiber sub-unit. By providing the optical fibers constrained as a unit in optical fiber sub-units, the optical fiber sub-units may be constrained in a furcation assembly without having to expose the optical fibers within the optical fiber sub-units, thereby reducing complexity in fiber optic cable assembly preparations. Avoiding exposing optical fibers in a furcation assembly may also reduce the risk of damaging the optical fibers during furcation assembly preparations. Constraining the optical fibers within the optical fiber sub-units may also, as non-limiting examples, provide low optical skew, may reduce or eliminate entanglement between the optical fibers and the cable strength members to reduce or avoid optical attenuation, and/or may allow the optical fibers to act as anti-buckling components within the fiber optic cable.

Figure 1:
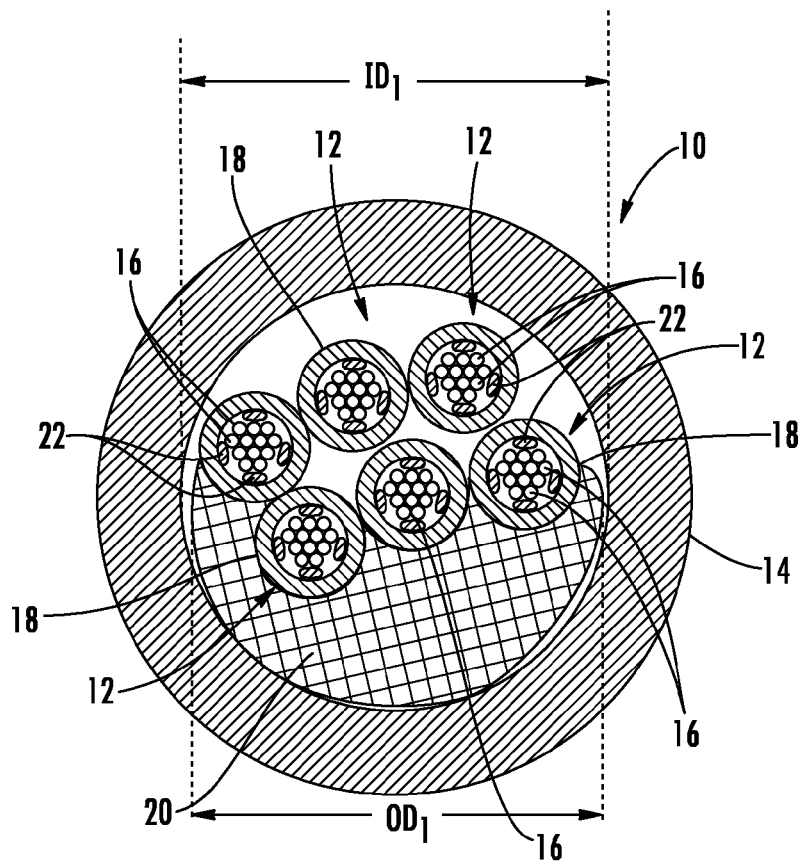
FIG. 1 is an end view of a cross-section of an exemplary multi-fiber, fiber optic cable comprised of a plurality of optical fiber sub-units disposed within a cable jacket, each of the plurality of optical fiber sub-units comprising a plurality of optical fibers and one or more sub-unit strength members disposed in a sub-unit jacket.
Figure 2:
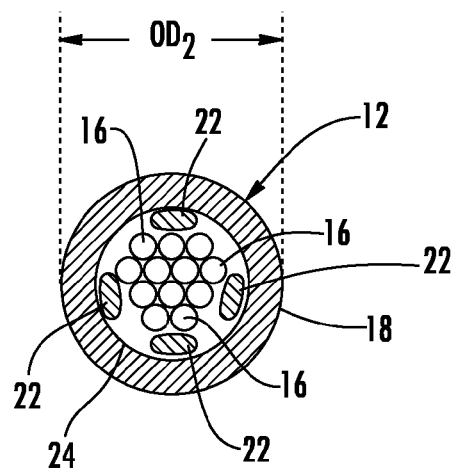
FIG. 2 is an end view of a cross-section of one optical fiber sub-unit disposed inside the cable jacket of the fiber optic cable in FIG. 1.

In this regard, FIG. 1 is an end view of a cross-section of one exemplary multi-fiber, fiber optic cable 10. The fiber optic cable 10 may be used as a distribution cable or drop cable as non-limiting examples. With continuing reference to FIG. 1, the fiber optic cable 10 is comprised of a plurality of optical fiber sub-units 12 disposed longitudinally within a cable jacket 14. FIG. 2 is an end view of a cross-section of one optical fiber sub-unit 12 disposed inside the cable jacket 14 of the fiber optic cable 10 in FIG. 1. With reference back to FIG. 1, the plurality of optical fiber sub-units 12 are disposed in the cable jacket 14, but only one optical fiber sub-unit 12 could be disposed in the cable jacket 14 if desired as well. Each optical fiber sub-unit 12 disposed in the cable jacket 14 of the fiber optic cable 10 in this embodiment includes a plurality of optical fibers 16 disposed within a sub-unit jacket 18. The optical fibers 16 may be buffered or not buffered. As a non-limiting example, twelve (12) optical fibers 16 may be disposed within each sub-unit jacket 18 of each optical fiber sub-unit 12 to provide multi-fibered optical fiber sub-units 12. Any number of the optical fibers 16 may be disposed in each optical fiber sub-unit 12. Further, different optical fiber sub-units 12 may contain different counts of optical fibers 16, if desired. As will be discussed in more detail below, end portions of the optical fibers 16 may be connectorized or pre-connectorized with fiber optic connectors for establishing fiber optic connections with the optical fibers 16 in the fiber optic cable 10.

With continuing reference to FIG. 1, a cable strength member 20 is also disposed longitudinally inside the cable jacket 14 adjacent to the optical fiber sub-units 12. The cable strength member 20 provides strength support in the fiber optic cable 10 to resist excessive elongation to prevent or reduce the risk of damage to the optical fibers 16 and/or to reduce or avoid optical attenuation. One or more cable strength members 20 may be disposed inside the cable jacket 14. As a non-limiting example, the cable strength member 20 may be provided as one or more tensile yarns. As another non-limiting example, the cable strength member 20 may be manufactured from aramid, such as Kevlar®. Other examples of materials that may be employed for the cable strength member 20 include, but are not limited to fiberglass, ultra high molecular weight polyethylene (UHMWPE) such as Dyneema® for example, paraaramid copolymers such as Technora® for example, or other such tensile yarns.

With continuing reference to FIG. 1, in this embodiment, the optical fiber sub-units 12 are optionally loosely disposed in the cable jacket 14 adjacent to the cable strength member 20. In this manner, the optical fiber sub-units 12 can move between each other and with respect to the cable strength member 20 and the cable jacket 14. In one embodiment, the optical fiber sub-units 12 may be exposed from the cable jacket 14 to provide furcation legs from the fiber optic cable 10. Disposing the optical fiber sub-units 12 loosely in the cable jacket 14 can allow for a furcation assembly that directs a tensile load (e.g., a pulling load) primarily to the cable strength member 20 and/or the cable jacket 14 as opposed to the optical fiber sub-units 12 to protect the optical fibers 16 from damage. As another non-limiting example, disposing the optical fiber sub-units 12 loosely within the cable jacket 14 may also avoid the need for stranding between the optical fiber sub-units 12 and the cable strength member 20, which can reduce manufacturing complexity. Stranding may also cause the cable strength members 20 to be longer than the optical fiber sub-units 12 such that tensile loads applied to the fiber optic cable 10 are firstly or primarily borne by the optical fiber sub-units 12 and then secondly or secondarily by the cable strength member 20. The cable strength member 20 may also be disposed loosely within the cable jacket 14 to allow further freedom of relative movement between the optical fiber sub-units 12 and the cable strength member 20 within the cable jacket 14.

With continuing reference to FIG. 1, an inner diameter $ID_1$ of the cable jacket 14 may be greater than an outer diameter $OD_1$ of the collective grouping of the optical fiber sub-units 12 and cable strength member 20 disposed inside the cable jacket 14 to allow relative freedom of movement between the optical fiber sub-units 12, and the cable strength member 20 and/or the cable jacket 14. As one non-limiting example, the inner diameter $ID_1$ of the cable jacket 14 may be 3.0 mm to 12.5 mm depending on the number optical fiber sub-units 12 included in the fiber optic cable 10. As other non-limiting examples, as illustrated in FIG. 2, an outer diameter $OD_2$ of the optical fiber sub-unit 12 may be less than 3.1 millimeters (mm), and may be 3.0 mm, 2.0 mm, or 1.6 mm as examples. As another non-limiting example, the inner diameter $ID_1$ of the cable jacket 14 may be at least 0.5 mm greater than the collective outer diameter $OD_1$ of the optical fiber sub-units 12 and cable strength member 20.

With reference back to FIG. 1, the optical fiber sub-units 12 may be disposed loosely inside the cable jacket 14 over the entire longitudinal length of the fiber optic cable 10. Alternatively or in addition, the optical fiber sub-units 12 may be disposed at an end portion of the fiber optic cable 10. If the optical fiber sub-units 12 are disposed loosely over the entire longitudinal length of the fiber optic cable 10, this disposition may be accomplished during manufacturing of the fiber optic cable 10. If the optical fiber sub-units 12 are disposed loosely at an end portion of the fiber optic cable 10, this disposition may be accomplished post manufacturing of the fiber optic cable 10. Examples of these techniques will be discussed in more detail below.

With continuing reference to FIGS. 1 and 2, the optical fiber sub-units 12 disposed in the fiber optic cable 10 also have the feature of constraining movement of the optical fibers 16 disposed therein. In this regard with reference to FIG. 2, the optical fibers 16 are disposed within the sub-unit jacket 18 of the optical fiber sub-unit 12. One or more sub-unit strength members 22 are also disposed within the sub-unit jacket 18 adjacent the optical fibers 16. The sub-unit strength members 22 may be manufactured from the same or different material than the cable strength member 20. Also, the optical fibers 16 could be tight buffered within the sub-unit jackets 18 either adjacent to one or more sub-unit strength members 22 also provide within a sub-unit jacket 18 or in a sub-unit jacket 18 that does not include the sub-unit strength member 22.

The quantity of strength members can be described by axial rigidity, which is the modulus of elasticity times the cross sectional area of a material. For a composite material such as a cable, the axial rigidity is the sum of the axial rigidity of the individual elements of the cable. For each component of a cable, the axial rigidity can be the load bearing area times the modulus of elasticity for the material. In this regard with reference to FIG. 1, the total axial rigidity of the fiber optic cable 10 may be the sum of the axial rigidity of the optical fiber sub-units 12, the cable strength members 20, the cable jacket 14, and any other components of the fiber optic cable 10. Likewise, the axial rigidity of each of the optical fiber sub-units 12 would be the sum of the axial rigidity of the sub-unit strength members 22, the sub-unit jacket 18, and any other components of the optical fiber sub-unit 12. The total axial rigidity of the optical fiber sub-units 12 would be the sum of the axial rigidity of all the individual optical fiber sub-units 12. In one embodiment, the strength of the optical fibers 16 is not included in the total axial rigidity of each of the optical fiber sub-units 12, because the fiber optic cable 10 is designed to reduce the strain on the optical fibers 16. In another embodiment, the strength of the optical fibers 16 can be included in the total axial rigidity of each of the optical fiber sub-units 12. Further, the axial rigidity of the cable jacket 14 and the sub-unit jackets 18 as well as any fiber coatings on the optical fibers 16 may be insignificant enough to be ignored in an axial rigidity calculation.

As a non-limiting example, axial rigidity may be calculated as follows:

$$\text{Axial\_Rigidity} = \sum_i E_i A_i,$$

where:

$E_i$ is the elastic modulus of material i; and $A_i$ is the load bearing area of component i.

As an example, for a 380 grams denier (i.e., gram weight for 9000 meters) aramid yarn strength member, the sum of EA may be 3.33 kiloNewtons (kN). For a 1420 grams denier aramid yarn strength member, the EA may be 12.63 kN. In one embodiment, each optical fiber sub-units 12 may have four (4) 380 grams denier aramid yarns strength members 22, providing for the total axial rigidity (i.e., EA) of the sub-unit strength members 22 to be 4×3.33 kN=13.32 kN. The amount of cable strength member 20 provided in the fiber optic cable 10 located outside the sub-unit jackets 18 may vary based on the total optical fiber 16 count provided in the fiber optic cable 10. The following table provides exemplary calculations for the axial rigidity of cable strength members 20 and the sub-unit strength members 22 of various possible fiber optic cable 10 designs in accordance with embodiments disclosed herein.

| Fiber optic cable (10) | Number of optical fiber sub-units (12) | Sum of optical fiber sub-unit (12) EA | Number of 1420 grams denier aramid yarns (200 outside optical fiber sub-units (12) | EA outside optical fiber sub-units (12) | Total EA | % total EA in one optical fiber sub-unit (12) | % total EA in all optical fiber sub-units (12) |
|---|---|---|---|---|---|---|---|
| 12 f | 1 | 13.3 | 8 | 101.0 | 114.4 | 11.6% | 12% |
| 24 f | 2 | 26.6 | 12 | 151.6 | 178.2 | 7.5% | 15% |
| 48 f | 4 | 53.3 | 12 | 151.6 | 204.8 | 6.5% | 26% |
| 72 f | 6 | 79.9 | 16 | 202.1 | 282.0 | 4.7% | 28% |
| 96 f | 8 | 106.6 | 16 | 202.1 | 308.6 | 4.3% | 35% |
| 144 f | 12 | 159.8 | 16 | 202.1 | 361.9 | 3.7% | 44% |

The same non-limiting examples provided above with regard to the cable strength member 20 are also applicable as non-limiting examples for the sub-unit strength members 22. As additional non-limiting examples, the axial rigidity of each of the optical fiber sub-units 12 can be less than fifteen percent (15%) of the total axial rigidity of the one or more cable strength members 20 and the sub-unit strength members 22 of the fiber optic cable 10. The combined axial rigidity of all of the sub-unit strength members 22 of the optical fiber sub-units 12 can be less than fifty percent (50%) of the total axial rigidity of the cable strength members 20 and the sub-unit strength members 22 of the fiber optic cable 10.

With continuing reference to FIG. 2, the sub-unit strength members 22 are disposed longitudinally adjacent to the optical fibers 16 along the length of the optical fiber sub-units 12. The optical fibers 16 are disposed inside the sub-unit jacket 18 such that movement of the optical fibers 16 is contained by an interior wall 24 of the sub-unit jacket 18 and/or the sub-unit strength members 22. The optical fibers 16 may be constrained by friction themselves, which constrains the relative longitudinal movement of the optical fibers 16 relative to each other. For example, the group of optical fibers 16 inside each sub-unit jacket 18 may have an effective diameter of 1.0 mm inside a 1.4 mm inner diameter sub-unit jacket 18. The sub-unit strength members 22 may be about 0.1 mm in thickness as an example. Thus, the optical fiber 16 to optical fiber 16 contact is provided by the limited free space within the optical fiber sub-unit 12 that enables the friction between the optical fibers 16 to limit relative longitudinal movement between the optical fibers 16. The ability to produce low skew optical fiber sub-units 12 can be determined in the ability to limit the relative longitudinal movement of the individual optical fibers 16 within an optical fiber sub-unit 12.

Constraining the optical fibers 16 within the optical fiber sub-units 12 may allow the optical fibers 16 disposed within a given optical fiber sub-unit 12 to be held together as a unit within the optical fiber sub-unit 12. As will be discussed in more detail below, by providing the optical fibers constrained as a unit in optical fiber sub-units, the optical fiber sub-units may be exposed and constrained in a furcation assembly without exposing the optical fibers contained in the optical fiber sub-units. This feature may reduce complexity and labor costs in furcation assembly preparations. Further, the optical fibers may be subjected to less risk of damage if not exposed in a furcation assembly.

Constraining the optical fibers 16 within the optical fiber sub-units 12 may also provide low optical skew of the fiber optic cable 10 acting as a parallel optic system with multiple optical fibers 16 disposed in each optical fiber sub-unit 12. As non-limiting examples, constraining the optical fibers 16 in the optical fiber sub-units 12 may provide an optical skew less than 6.1 picoseconds (ps) per meter (m) (ps/m). As another non-limiting example, constraining the optical fibers 16 in the optical fiber sub-units 12 may provide an optical skew less than 3.6 ps/m. As non-limiting examples, constraining the optical fibers 16 in the optical fiber sub-units 12 may also allow the optical fibers 16 within each optical fiber sub-unit 12 to act as anti-buckling components within the fiber optic cable 10 to resist bending and avoid optical attenuation that would result from such bending.

Figure 3:
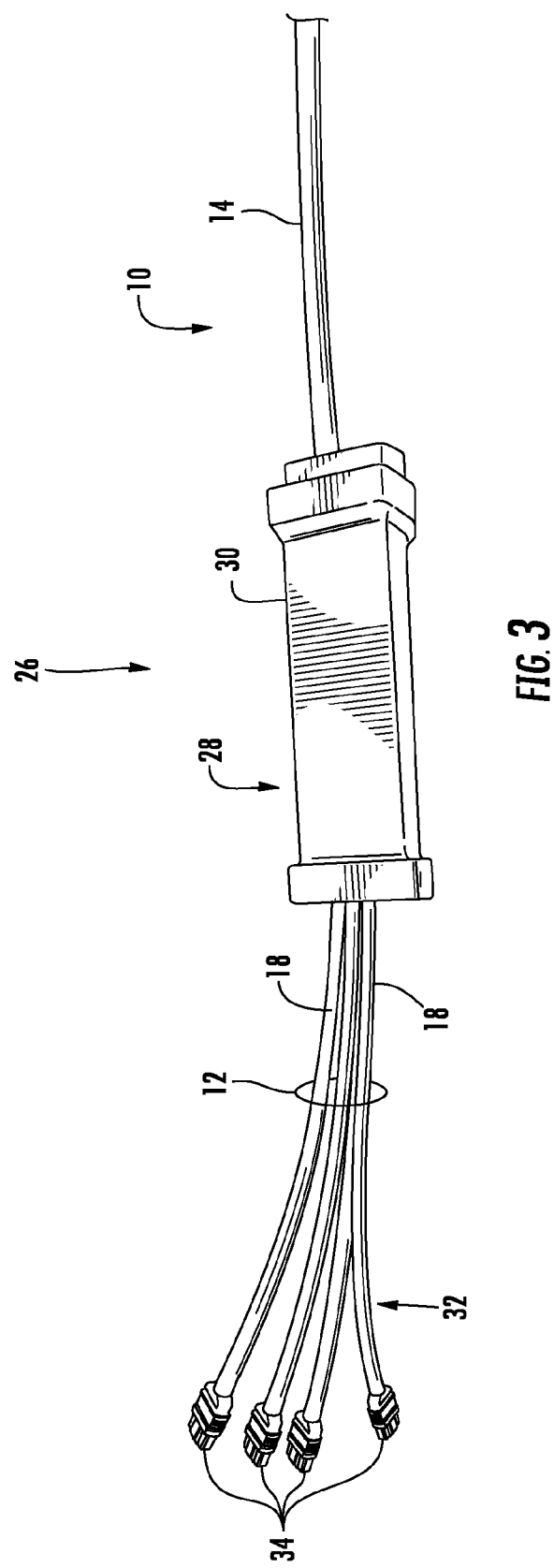
FIG. 3 is a top perspective view of an exemplary fiber optic cable assembly comprised of a portion of end portions of the optical fiber sub-units ("optical fiber sub-unit end portions") and a portion of end portions of cable strength member(s) ("cable strength member end portion(s)") exposed from the cable jacket of an end portion of the fiber optic cable of FIG. 1 secured inside a furcation plug of a furcation assembly.

The fiber optic cable 10 in FIG. 1 can be furcated to expose the optical fiber sub-units as furcation legs for connecting the optical fibers to other connectors, adapters, or fiber optic equipment. In this regard, FIG. 3 illustrates a top perspective view of an exemplary fiber optic cable assembly 26 that includes the fiber optic cable 10 in FIG. 1. As illustrated in FIG. 3, the fiber optic cable assembly 26 includes a furcation assembly 28. In this embodiment, the furcation assembly 28 is a furcation plug 30, but the furcation assembly 28 may be comprised of alternative furcation assemblies as will be discussed in more detail below. End portions 32 of the optical fiber sub-units 12 extend from the furcation plug 30 to provide furcated legs. The optical fiber sub-units 12 can provide furcated legs without the need for additional furcation tubing. The optical fiber sub-units 12 in this embodiment do not have preferential bend. As a non-limiting example, this may allow the optical fiber sub-units 12 acting as furcated legs to be about 2.0 mm to 3.0 mm in outer diameter, which may reduce congestion of furcated legs in fiber optic equipment. The end portions 32 of the optical fiber sub-units 12 are connectorized with fiber optic connectors 34 to provide connection access to the optical fibers 16 contained in the optical fiber sub-units 12. For example, the fiber optic connectors may be multi-fiber termination push-on (MTP) style fiber optic connectors, but other fiber optic connector types are also possible, including but not limited to SC, FC, LC, ST, and duplex connectors.

As will be discussed in more detail below, providing the optical fibers 16 constrained in the optical fiber sub-units 12 while providing for movement of the optical fiber sub-units 12 within the cable jacket 14 relative to the cable jacket 14 and/or the cable strength member 20 can provide certain non-limiting advantages. One advantage includes the furcation assembly 28 directing tensile load (e.g., a pulling load) away from the optical fibers 16 and to the cable jacket 14 and/or the cable strength member 20. Another advantage includes not having to expose the optical fibers 16 from within the sub-unit jacket 18 in the furcation assembly 28 to secure the optical fibers 16 therein. Because the optical fibers 16 are constrained within the sub-unit jacket 18, constraining of the sub-unit jackets 18 can provide sufficient securing of the optical fibers 16 in the furcation assembly 28. The process of exposing optical fibers 16 within a sub-unit jacket 18 can be more costly in terms of time and labor costs than the ability to secure the sub-unit jackets 18 in the furcation assembly 28 without having to expose the optical fibers 16.

Figure 4:
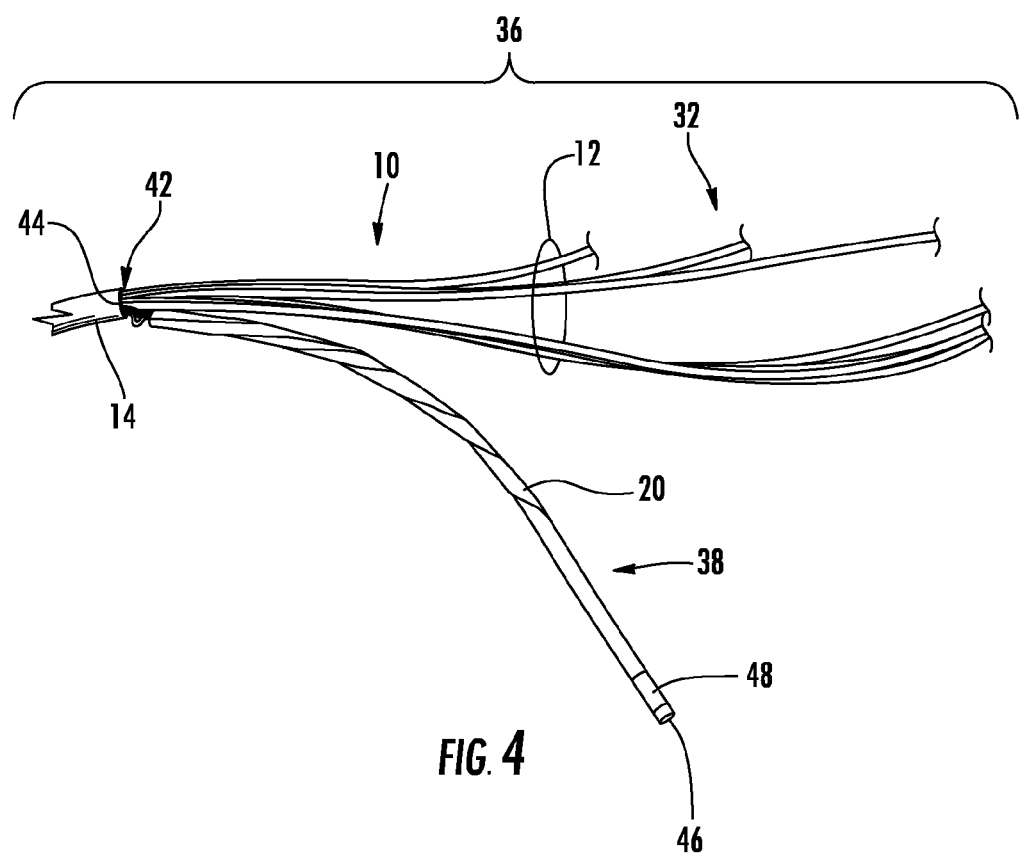
FIG. 4 illustrates an end portion of the fiber optic cable in FIG. 1 cut to a desired length with a portion of an end portion of the cable jacket removed to expose the optical fiber sub-unit end portions and cable strength member end portions from the end portion of the cable jacket to prepare for providing the furcation assembly, including the furcation plug in FIG. 3.

Prior to providing the furcation assembly 28 in FIG. 3, the fiber optic cable 10 undergoes certain preparations. In this regard, FIG. 4 is provided. FIG. 4 illustrates an end portion 36 of the fiber optic cable 10 in FIG. 1. The end portion 36 of the fiber optic cable 10 is cut to a desired length. Thereafter, a portion of the cable jacket 14 is windowed or removed to expose end portions 32 of the optical fiber sub-units 12 and an end portion 38 of the cable strength member 20. As a result, a transition interface 42 is provided between an end 44 of the cable jacket 14 and the optical fiber sub-units 12 and cable strength member 20. The end portion 38 of the cable strength member 20 may be optionally twisted, as illustrated in FIG. 4, prior to preparing a furcation assembly in the end portion 36 of the fiber optic cable 10 to enhance the strength of the cable strength member 20 when disposed in a furcation assembly. To retain the twist in the end portion 38 of the cable strength member 20, tape 48 or other securing means may be disposed around an end 46 of the cable strength member 20.

Figure 5:
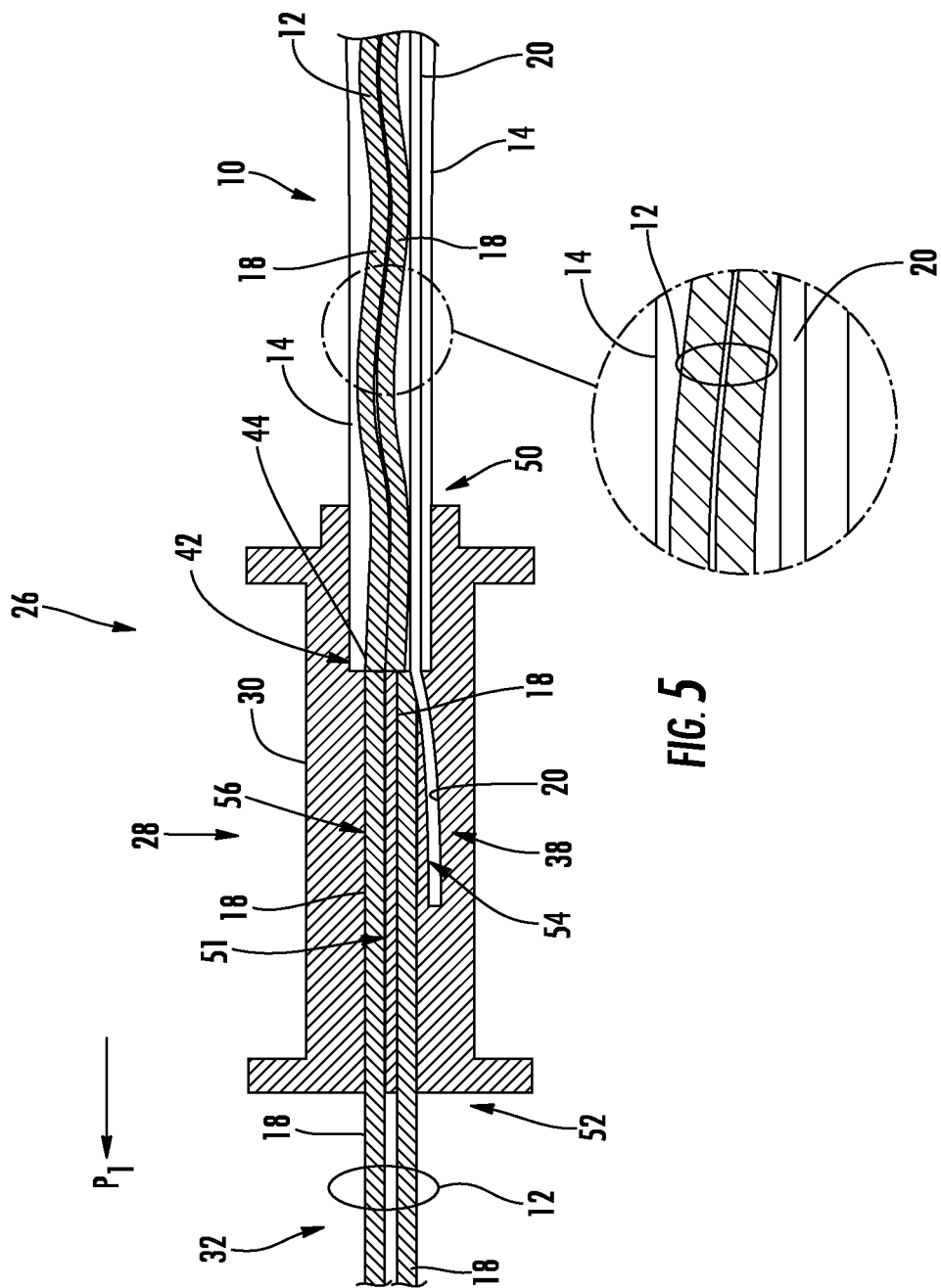
FIG. 5 is a schematic side view of a cross-section of the fiber optic cable assembly in FIG. 3 illustrating the optical fiber sub-units disposed in the cable jacket of the fiber optic cable adjacent to the one or more cable strength members to allow movement between the one or more optical fiber sub-units and the one or more cable strength members within the cable jacket.

FIG. 5 is a side view of a cross-section of the fiber optic cable assembly 26 in FIG. 3 illustrating the optical fiber sub-units 12 and cable strength member 20 disposed in the furcation plug 30 to provide the furcation assembly 28. The end portions 32 of the optical fiber sub-units 12 are disposed through a first end 50 of the furcation plug 30, into an interior chamber 51 of the furcation plug 30, and extend out from a second end 52 of the furcation plug 30. Note that optical fibers 16 are not exposed from the optical fiber sub-units 12 in the interior chamber 51 of the furcation plug 30, because the optical fibers 16 are constrained in the sub-unit jackets 18.

The end portion 38 of the cable strength member 20 is also disposed through the first end 50 of the furcation plug 30.

With continuing reference to FIG. 5, the cable strength member 20 is cut so that an end 54 of the cable strength member 20 does not extend through the second end 52 of the furcation plug. The end 54 of the cable strength member 20 is retained inside the interior chamber 51 of the furcation plug 30. The end 44 of the cable jacket 14 is terminated inside the interior chamber 51 of the furcation plug 30. A potting compound or epoxy 56 can be disposed in the interior chamber 51 of the furcation plug 30 to secure the portion of end portion 38 of the cable strength member 20 and portions of the end portion 32 of the optical fiber sub-units 12 in the furcation plug 30. In this manner, when a tensile or tensile load (e.g., a pulling load) $P_1$ is placed on the furcation plug 30, the tensile load $P_1$ can be translated to the cable strength member 20 and/or cable jacket 14 secured inside the interior chamber 51 of the furcation plug 30.

Figure 6:
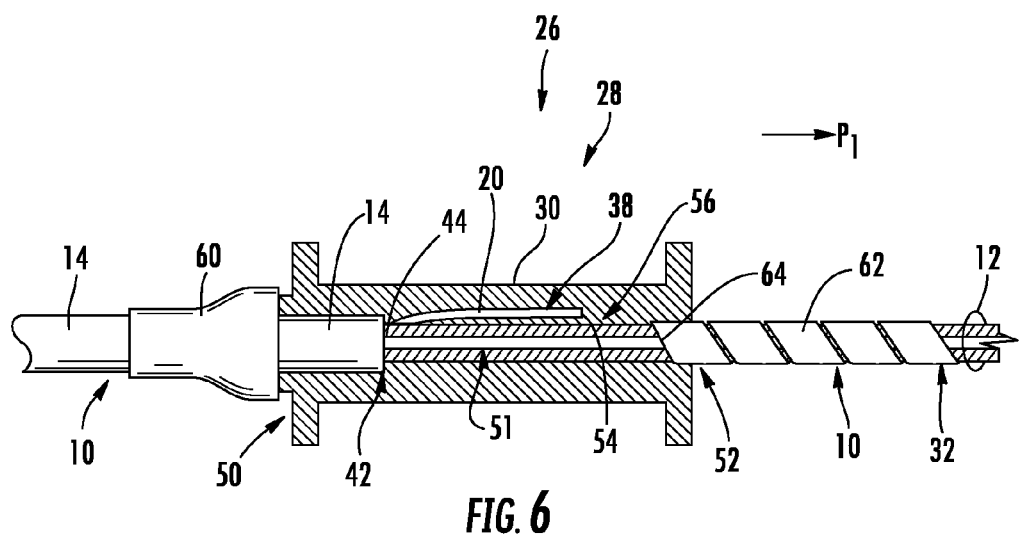
FIG. 6 is a schematic side view of a cross-section of the fiber optic cable assembly of FIG. 3 illustrating an optional exemplary strain relief member and optional exemplary spiral-wound tubing securing the optical fiber sub-units.

FIG. 6 illustrates the fiber optic cable assembly 26 of FIG. 5, but an optional strain relief device 60 and cable wrap 62 are provided. The strain relief device 60 interfaces between the cable jacket 14 and the first end 50 of the furcation plug 30 to provide strain relief when the cable jacket 14 is bent about the furcation plug 30. The strain relief device 60 may be a boot, and may be a separate or integral component to the furcation plug 30. The cable wrap 62 may be disposed around the optical fiber sub-unit 12 to group the optical fiber sub-units 12 together extending from the second end 52 of the furcation plug 30. An end 64 of the cable wrap 62 may be secured inside the furcating plug 30.

To further improve the pulling characteristics of the furcation assembly 28 in FIGS. 5 and 6 to direct tensile load (e.g., a pulling load) away from the optical fibers 16, the features of the fiber optic cable 10 can be employed. Specifically, the end portion 38 of the cable strength member 20 can be pulled taut prior to securing the end portion 38 in the furcation plug 30, as illustrated in FIG. 5. Because the optical fiber sub-units 12 can be loosely disposed in the cable jacket 14 of the fiber optic cable 10, the length of the optical fiber sub-units 12 with the cable jacket 14 can be made longer than the length of the cable strength member 20. The length of the cable strength member 20 is greater than the length of the optical fiber sub-units 12 in the cross-section of the cable jacket 14 adjacent to the transition interface 42 in this embodiment. The length of the cable strength member 20 can also be greater than the length of the optical fiber sub-units 12 in the cross-section of the cable jacket 14 in any portion of the fiber optic cable 10 if the optical fiber sub-units 12 are provided longer than the cable strength member 20 over the entire length of the fiber optic cable 10 during manufacturing of the fiber optic cable 10.

As one non-limiting example, the relative longitudinal movement of the optical fiber sub-units 12 within the end 44 of the cable jacket 14 can be greater than four (4) mm. In another non-limiting example, the relative longitudinal movement of the optical fiber sub-units 12 within the end 44 of the cable jacket 14 can be greater than ten (10) mm. In this regard, when the tensile load (e.g., a pulling load) $P_1$ is placed on the furcation plug 30, the tensile load $P_1$ is directed primarily to the taut cable strength member 20 as opposed to primarily the optical fiber sub-units 12 and optical fibers 16 disposed therein. The cable strength member 20 will carry the bulk of the tensile load $P_1$ while directing less of the tensile load $P_1$ to the optical fiber sub-units 12. The tensile load $P_1$ may be directed away from the optical fiber sub-units 12 and optical fibers 16 disposed therein. In this manner, damage to the optical fibers 16 is reduced or eliminated as a result of pulling the fiber optic cable 10.

Providing the cable strength member 20 in the cable jacket 14 of the fiber optic cable 10 of a length shorter than the optical fiber sub-units 12 can be accomplished in at least two methods. In one method, end portions 32 of the optical fiber sub-units 12 can be pushed into the end 44 of the cable jacket 14, as illustrated in FIGS. 5 and 6. The end portion 38 of the cable strength member 20 is pulled taut from the end 44 of the cable jacket 14 so that the length of the cable strength member 20 is shorter than the length of the optical fiber sub-units 12.

Figure 7:
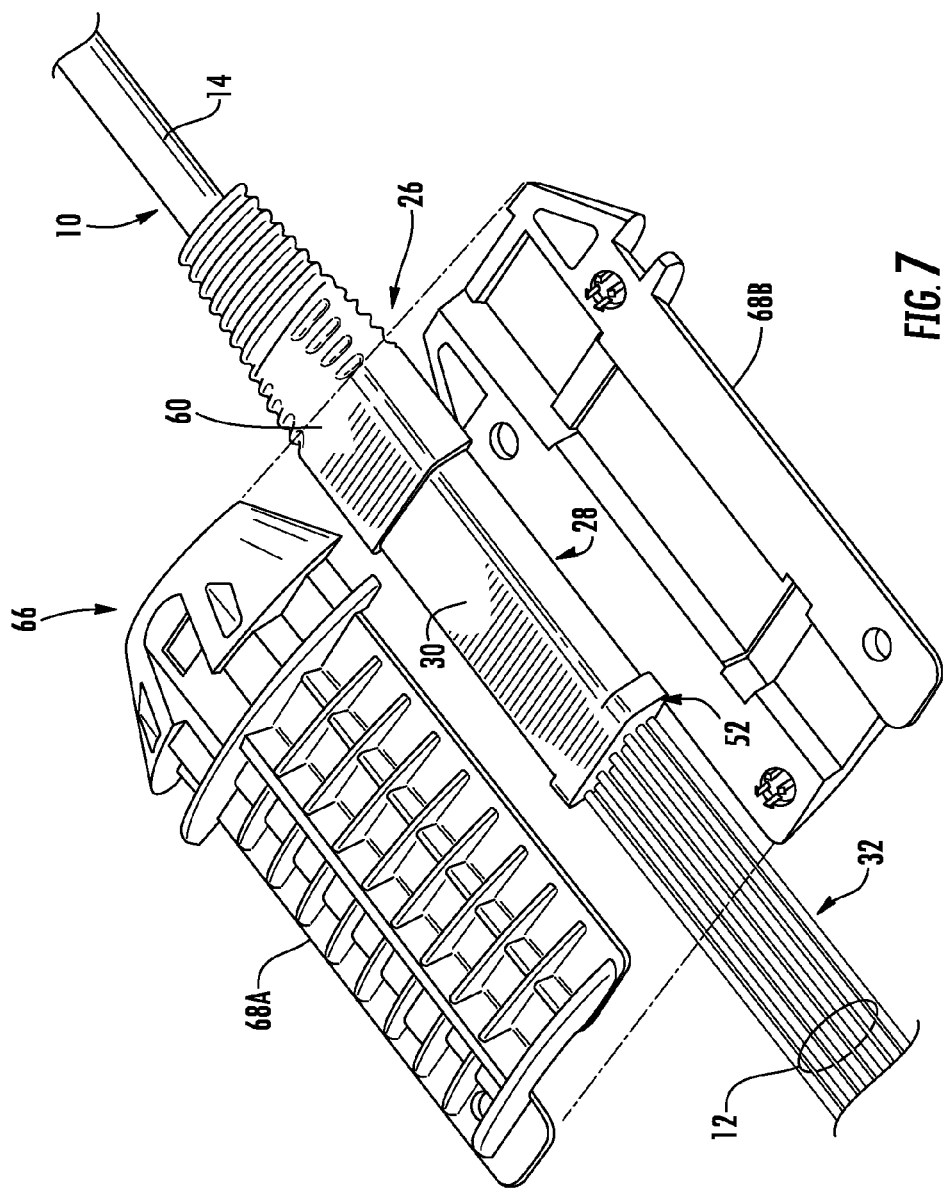
FIG. 7 is a top perspective view of the fiber optic cable assembly in FIG. 3, wherein the furcation plug is arranged to be enclosed with an exemplary pulling grip sub-assembly for pulling the fiber optic cable.
Figure 8:
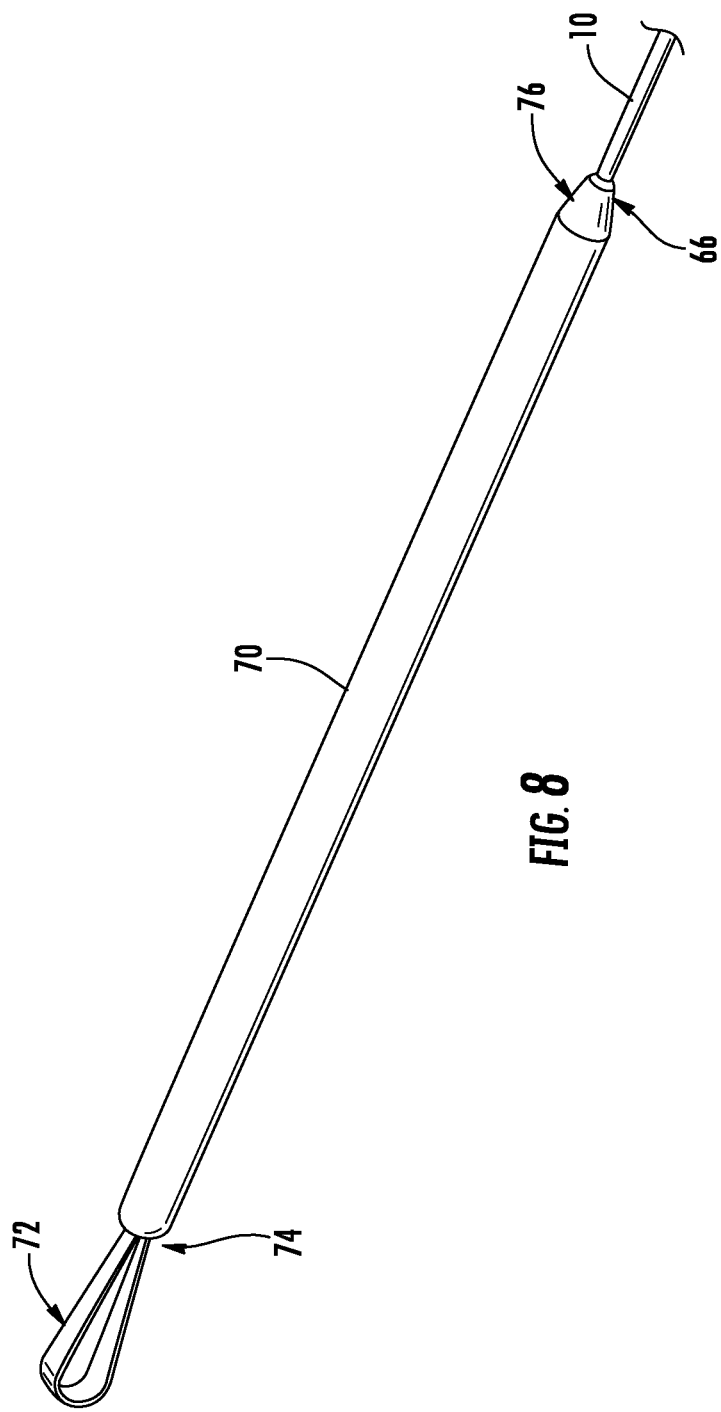
FIG. 8 illustrates the fiber optic cable assembly in FIG. 7 with the furcation plug enclosed in the pulling grip sub-assembly and enclosed in an exemplary pulling bag for pulling the fiber optic cable.
Figure 9:
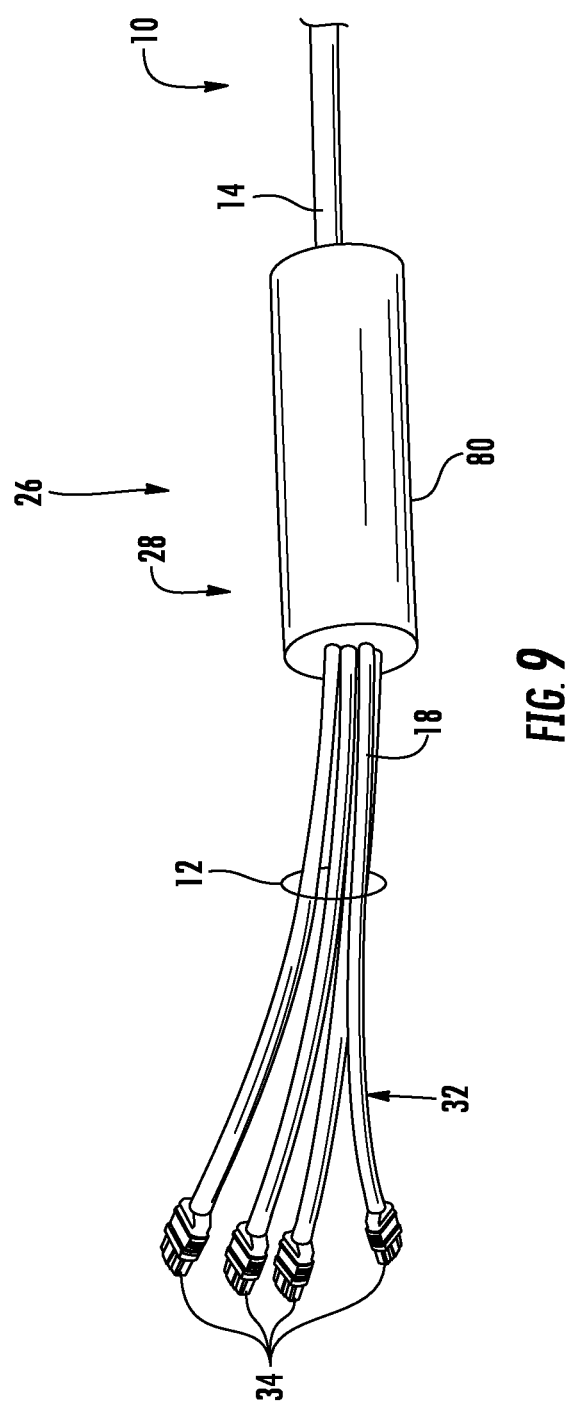
FIG. 9 is a top perspective view of the fiber optic cable assembly of FIG. 3 with an alternative exemplary furcation plug.

The length of the optical fiber sub-units 12 can also be provided longer within the cable jacket 14 than the cable strength member 20 during manufacture of the fiber optic cable 10. The tension at which the optical fiber sub-units 12 may be fed may be lower than the tension in which the cable strength member 20 may be fed during manufacture of the fiber optic cable 10 resulting in longer length optical fiber sub-units 12. For example, the length of the cable strength member 20 disposed in the cable jacket 14 may be shorter than the length of the optical fiber sub-units 12 by 1.0 mm to 6.0 mm per meter (mm/m) length of the cable jacket 14 or more. As another example, the length of the cable strength member 20 disposed in the cable jacket 14 may be shorter than the length of the optical fiber sub-units 12 up to 1 percent (1%), or 0.5 percent (0.5%), or even 0.1 percent (0.1%). In this regard, FIG. 7 is a top perspective view of the fiber optic cable assembly 26 in FIG. 5, wherein the furcation plug 30 is arranged to be enclosed with an exemplary pulling grip sub-assembly 66 comprised of two shells 68A, 68B adapted to be disposed on each other to secure the furcation plug 30 therebetween for pulling the fiber optic cable 10. FIG. 8 illustrates the fiber optic cable assembly 26 in FIG. 7 with the furcation plug 30 enclosed in the pulling grip sub-assembly 66 and enclosed in an exemplary pulling bag 70 for pulling the fiber optic cable 10. A loop 72 is disposed on an end 74 of the pulling bag 70 opposite of an end 76 retaining the pulling grip sub-assembly 66 for pulling the fiber optic cable 10. FIG. 9 is a top perspective view of a fiber optic cable assembly that is similar to the fiber optic cable assembly 26 of FIG. 3, but employing an alternative exemplary furcation plug 80. A pulling grip sub-assembly can be designed to retain the furcation plug 80, which can be disposed in the pulling bag 70 in FIG. 8 to pull the fiber optic cable.

In one embodiment, the furcation plug 30 does not transfer the tensile load $P_1$ placed on the furcation plug 30 to the optical fiber sub-units 12. In another embodiment, the furcation plug 30 is configured to sustain a tensile load of at least 100 pounds (lbs.) while producing less than 0.3% strain on the optical fiber sub-unit 12. In another embodiment, the furcation plug 30 is configured to sustain a tensile load of at least 150 lbs. while producing less than 0.2% strain on the optical fiber sub-units 12.

Figure 10A:
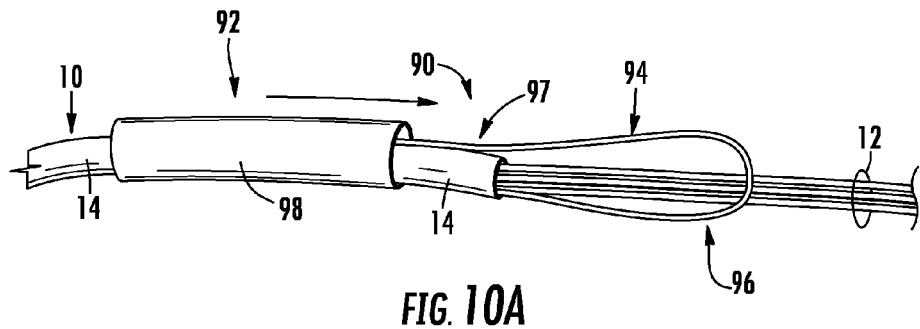
FIG. 10A illustrates an alternative fiber optic cable assembly comprised of optical fiber sub-unit end portions and cable strength member end portion(s) exposed from the cable jacket of an end portion of the fiber optic cable of FIG. 1, wherein a cable strength member pulling loop is formed from disposing and securing a loop disposed in the cable strength member end portion on the cable jacket.
Figure 10B:
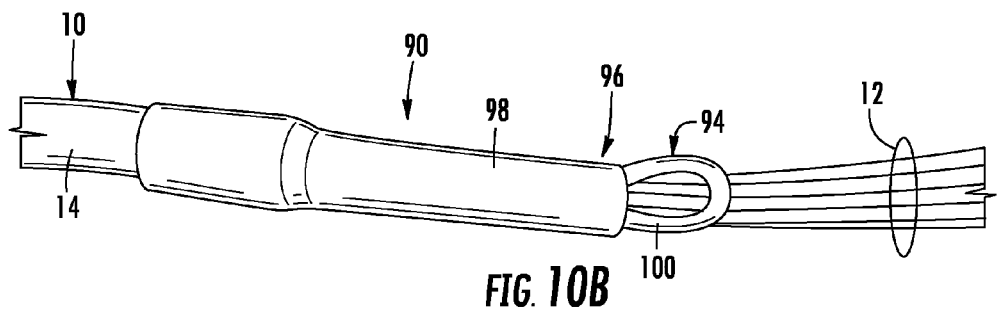
FIG. 10B illustrates the fiber optic cable assembly in FIG. 10A with the cable strength member pulling loop fully assembled.

Other furcation assemblies can be provided that employ the fiber optic cable 10 in FIG. 1 or a fiber optic cable that contains some or all features provided in the fiber optic cable 10 in FIG. 1. In this regard, FIG. 10A illustrates an alternative fiber optic cable assembly 90. The fiber optic cable assembly 90 includes a furcation assembly 92 that furcates the optical fiber sub-units 12 and provides a cable strength member pulling loop 94, as opposed to a furcation plug, for pulling the fiber optic cable 10. FIG. 10B illustrates the fiber optic cable assembly 90 in FIG. 10A with the cable strength member pulling loop 94 fully assembled. As illustrated in FIG. 10A, the cable strength member pulling loop 94 is formed by looping a first end 97 of a cable strength member end portion 96 back onto itself and towards a cable jacket tube 98 of the fiber optic cable 10. In this manner, the cable strength member pulling loop 94 can be pulled to pull the fiber optic cable 10, wherein the tensile load (e.g., a pulling load) is directed onto the cable strength member pulling loop 94, which is formed from the cable strength member 20 disposed inside the fiber optic cable 10. Any size of cable strength member pulling loop 94 may be formed as desired. Because the cable strength member pulling loop 94 transfers tensile load directly to the cable strength member 20, the cable strength member pulling loop 94 does not transfer the tensile load to the optical fiber sub-units 12.

Figure 11:
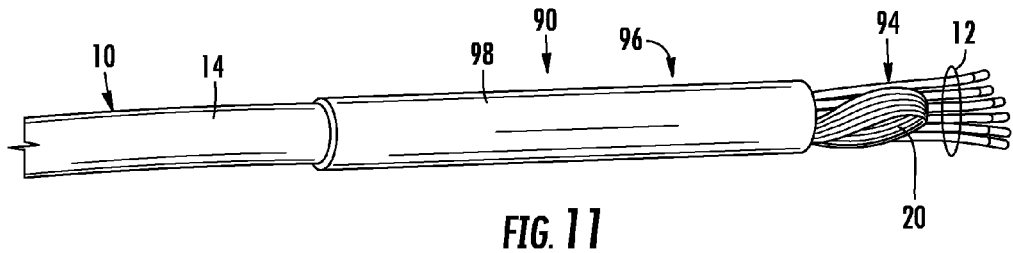
FIG. 11 illustrates the fiber optic cable assembly in FIGS. 10A and 10B, wherein the cable strength member pulling loop is not disposed in a strength member tube.

As one non-limiting example, the cable strength member pulling loop 94 may be two (2) to three (3) inches in circumference. The first end 97 of the cable strength member end portion 96 is secured to the cable jacket 14 to secure the formation of the cable strength member pulling loop 94 in this embodiment. FIG. 10B illustrates the cable jacket tube 98 after being heat shrunk onto the cable strength member pulling loop 94 and the cable jacket 14 of the fiber optic cable 10 to secure the cable strength member pulling loop 94 to the cable jacket 14. As one non-limiting example, the cable jacket tube 98 may be heated to a temperature between 100 and 200 degrees Celsius for between two (2) and four (4) minutes to heat shrink and secure the cable jacket tube 98 to the cable strength member end portion 96 and the cable jacket 14. The cable strength member pulling loop 94 may further be disposed with a heat shrink tube 100, as illustrated in FIG. 10B, or may only consist of the cable strength member 20 without additional tubing, as illustrated in FIG. 11.

FIGS. 12-15 illustrate another exemplary fiber optic cable assembly 102 that may include a furcation assembly 101 disposed in a fiber optic cable 10, including the fiber optic cable 10 in FIG. 1. In this embodiment, a cable strength member pulling loop 103 is formed by the cable strength member end portion 96 disposed in two strength member tubes 104A, 104B to form an additional neck portion 106 in the cable strength member pulling loop 103. Providing a neck portion 106 in the cable strength member pulling loop 103 may assist in translating a tensile load (e.g., a pulling load) applied to the cable strength member pulling loop 103 in alignment with the longitudinal axis of the cable strength member 20 disposed inside the fiber optic cable 10. This may allow a greater tensile load to be applied to the cable strength member end portion 96. Because the cable strength member pulling loop 103 transfers tensile load directly to the cable strength member 20, the cable strength member pulling loop 103 does not transfer tensile load to the optical fiber sub-units 12.

Figure 12:
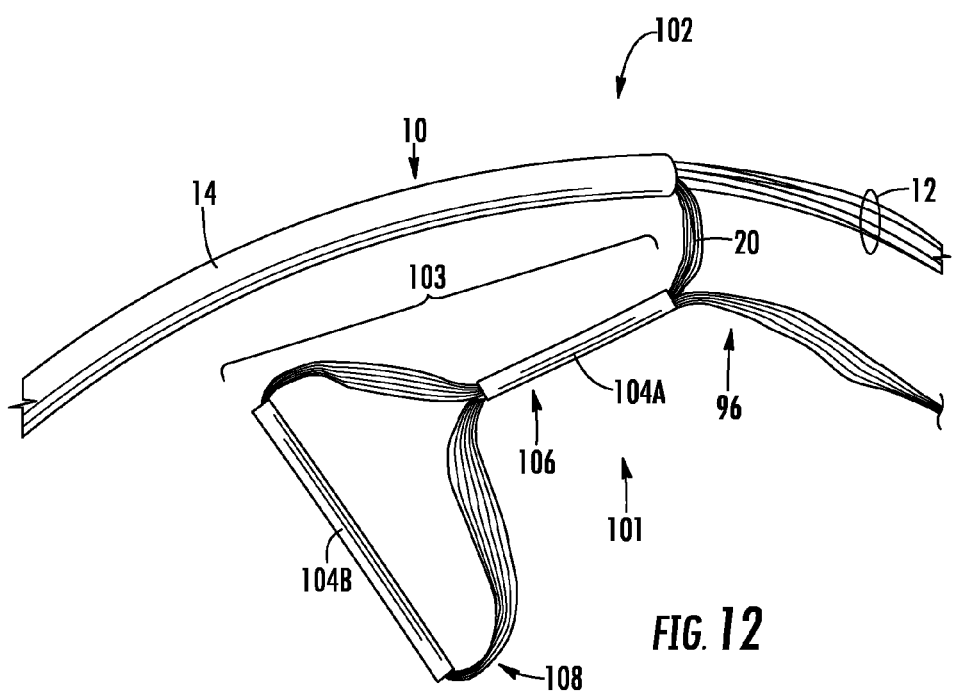
FIG. 12 illustrates an alternate exemplary fiber optic cable assembly comprised of a cable strength member pulling loop formed by disposing the cable strength member end portion through first and second heat shrink tubes and looping the end of the cable strength member end portion back through the first heat shrink tube adjacent to the cable jacket.
Figure 13:
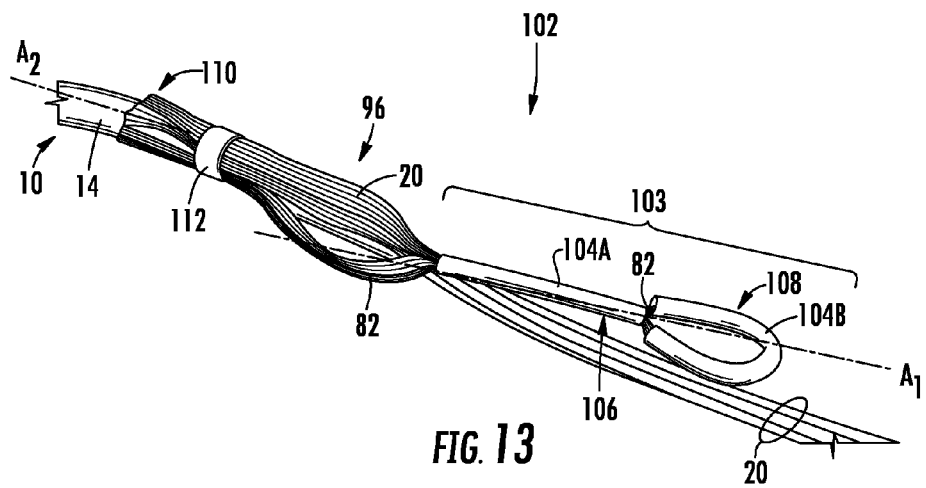
FIG. 13 illustrates the cable strength member pulling loop of the fiber optic cable assembly in FIG. 12 with the exposed cable strength member end portion trimmed and fanned around the cable jacket of the fiber optic cable.

The strength member tubes 104A, 104B may be heat shrink tubes. In this regard, heat can be applied to the strength member tubes 104A, 104B to heat shrink the strength member tubes 104A, 104B to be secured in place onto the cable strength member end portion 96 to form the neck portion 106 and a loop portion 108 in the cable strength member pulling loop 103, as illustrated in FIGS. 12 and 13. A tensile load placed on the loop portion 108 is translated to the neck portion 106, which is disposed along a longitudinal axis $A_1$ as illustrated in FIG. 13. Thus, if the neck portion 106 is disposed along a longitudinal axis $A_2$ of the fiber optic cable 10, the tensile load will be directed to the cable strength member 20 without the cable strength member 20 applying a force onto or expanding the cable jacket 14. As one non-limiting example, the strength member tubes 104A, 104B in FIG. 13 may be heated to a temperature between 100 and 200 degrees Celsius for between two (2) and four (4) minutes to heat shrink and secure the strength member tubes 104A, 104B to the cable strength member end portion 96 to form the cable strength member pulling loop 103. As also illustrated in FIG. 13, a first end 110 of the cable strength member end portion 96 can be pulled back onto and fanned about the cable jacket 14 of the fiber optic cable 10 to distribute the first end 110 onto the cable jacket 14. The first end 110 of the cable strength member end portion 96 can be secured to the cable jacket 14, such as with tape 112 or other securing means, as illustrated in FIG. 13.

Figure 14:
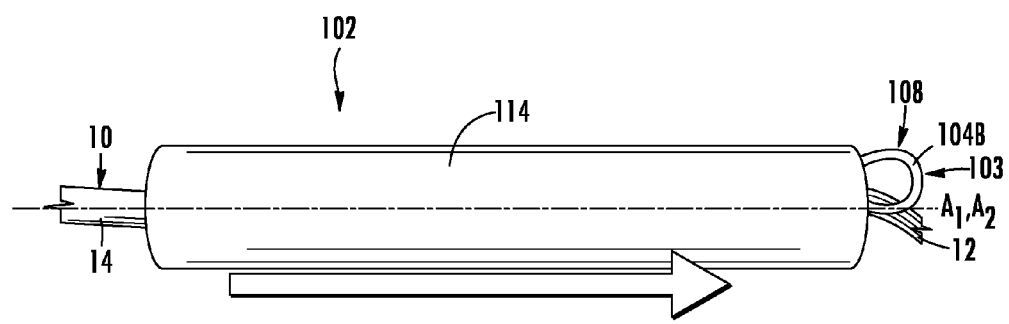
FIG. 14 illustrates disposing a cable jacket heat shrink tube over the cable strength member pulling loop in the fiber optic cable assembly in FIG. 13 to form an exemplary cable strength member pulling loop.
Figure 15:
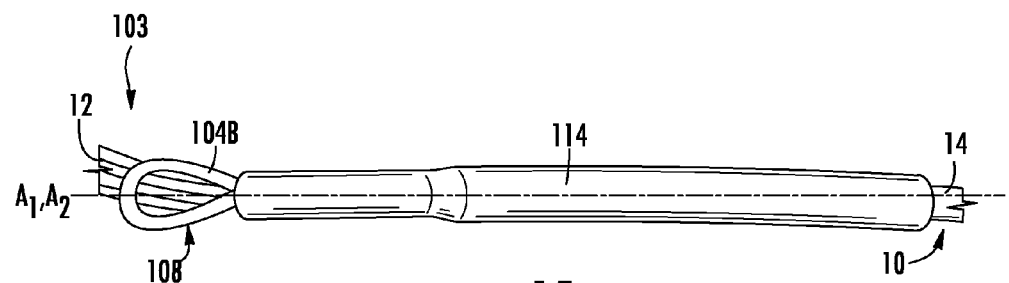
FIG. 15 illustrates the cable strength member pulling loop in the fiber optic cable assembly in FIG. 14 after exposing the cable jacket heat shrink tube to secure the cable strength member pulling loop to the cable jacket.

With reference to FIG. 14, to secure the first end 110 of the cable strength member end portion 96, a cable jacket tube 114 is provided as illustrated in FIGS. 14 and 25. The cable jacket tube 114 is used to secure the cable strength member pulling loop 103 to the cable jacket 14 of the fiber optic cable 10. FIG. 14 illustrates the cable jacket tube 114 before being heat shrunk onto the first end 110 of the cable strength member end portion 96 and the cable jacket 14 of the fiber optic cable 10. FIG. 15 illustrates the cable jacket tube 114 after being heat shrunk onto the first end 110 and the cable jacket 14 of the fiber optic cable 10. With reference to FIG. 14, the cable jacket tube 114 is disposed over the first end 110 of the cable strength member end portion 96 and the cable jacket 14 of the fiber optic cable 10 before the cable strength member pulling loop 103 is secured.

For example, the cable jacket tube 114 may be a heat shrink tube. In this regard, the cable jacket tube 114 is heated to heat shrink the cable jacket tube 114 onto the first end 110 of the cable strength member end portion 96 and the cable jacket 14 to secure the formed cable strength member pulling loop 103, as illustrated in FIG. 15. As one non-limiting example, the cable strength member pulling loop 103 may be heated to a temperature between 100 and 200 degrees Celsius for between two (2) and four (4) minutes to heat shrink and secure the cable jacket tube 114 to the cable strength member end portion 96 and the cable jacket 14. A pressing force may be applied to the cable jacket tube 114 to promote adhesion between the cable jacket tube 114 and the cable strength member end portion 96 to secure the cable strength member pulling loop 103 to the cable jacket 14 of the fiber optic cable 10.

As used herein, it is intended that terms "fiber optic cables" and/or "optical fibers" include all types of single mode and multi-mode light waveguides, including one or more optical fibers that may be up-coated, colored, buffered, ribbonized and/or have other organizing or protective structure in a cable such as one or more tubes, strength members, jackets or the like. The optical fibers disclosed herein can be single mode or multi-mode optical fibers. Likewise, other types of suitable optical fibers include bend-insensitive optical fibers, or any other expedient of a medium for transmitting light signals. An example of a bend-insensitive, or bend resistant, optical fiber is ClearCurve® Multimode fiber commercially available from Corning Incorporated. Suitable fibers of this type are disclosed, for example, in U.S. Patent Application Publication Nos. 2008/0166094 and 2009/0169163.

Many modifications and other embodiments of the embodiments set forth herein will come to mind to one skilled in the art to which the embodiments pertain having the benefit of the teachings presented in the foregoing descriptions and the associated drawings. As non-limiting examples, the number of optical fiber sub-units, the number of optical fibers provided within each optical fiber sub-unit, and the number of cable strength members provided in the fiber optic cable can vary as desired. The number of sub-unit strength members provided in each sub-unit jacket of an optical fiber sub-unit can vary as desired. The optical fibers can be buffered or non-buffered. The optical fibers can be tight buffered, such as within an optical fiber sub-unit cable either adjacent to one or more strength members in a sub-unit jacket or in a sub-unit jacket that does not include any strength members. Any type of furcation assembly desired can be employed to provide a furcation of the optical fiber sub-units from the fiber optic cable. The dimensions of any of the components disclosed herein can vary or be set as desired.

Therefore, it is to be understood that the description and claims are not to be limited to the specific embodiments disclosed and that modifications and other embodiments are intended to be included within the scope of the appended claims. It is intended that the embodiments cover the modifications and variations of the embodiments provided they come within the scope of the appended claims and their equivalents. Although specific terms are employed herein, they are used in a generic and descriptive sense only and not for purposes of limitation.

What is claimed is:

1. A fiber optic cable assembly, comprising:
   a fiber optic cable comprising a cable jacket, one or more cable strength members disposed within the cable jacket, and one or more optical fiber sub-units disposed within the cable jacket, wherein each optical fiber sub-unit includes a sub-unit jacket and a plurality of optical fibers disposed within the sub-unit jacket;
   an end portion of the fiber optic cable comprising end portions of the one or more optical fiber sub-units and end portions of the one or more cable strength members both exposed from an end portion of the cable jacket; and
   a furcation assembly receiving the end portion of the fiber optic cable at a first end of the furcation assembly, the furcation assembly terminating the end portion of the cable jacket and the end portions of the one or more cable strength members, and the end portions of the one or more optical fiber sub-units extending through and from a second end of the furcation assembly;
   the one or more cable strength members are disposed within the cable jacket in a first length, and the one or more optical fiber sub-units are disposed within the cable jacket in a second length, the second length greater than the first length
   wherein the furcation assembly transfers at least a portion of tensile load placed on the furcation assembly to the one or more cable strength members.

2. The fiber optic cable assembly of claim 1, wherein each of the plurality of optical fibers disposed in the one or more optical fiber sub-units are not exposed outside of the sub-unit jackets within the assembly.

3. The fiber optic cable assembly of claim 1, wherein the one or more optical fiber sub-units comprise tight buffered optical fibers disposed within the sub-unit jacket with no strength members disposed in the sub-unit jacket.

4. The fiber optic cable assembly of claim 1, wherein the furcation assembly preferentially transfers at least a portion of tensile load placed on the furcation assembly to the one or more cable strength members.

5. The fiber optic cable assembly of claim 4, wherein the furcation assembly preferentially transfers a majority tensile load placed on the furcation assembly to the one or more cable strength members.

6. The fiber optic cable assembly of claim 1, wherein the furcation assembly limits the tensile load transferred to the optical fiber sub-units.

7. The fiber optic cable assembly of claim 1, wherein the end portions of the one or more cable strength members are pulled taut from the end portion of the cable jacket in the furcation assembly.

8. The fiber optic cable assembly of claim 1, wherein the end portions of the one or more optical fiber sub-units are pushed into the end portion of the cable jacket.

9. The fiber optic cable assembly of claim 1, wherein a relative longitudinal movement of the one or more optical fiber sub-units within the cable jacket is greater than 4 mm.

10. The fiber optic cable assembly of claim 1, wherein a relative longitudinal movement of the one or more optical fiber sub-units within the cable jacket is greater than 10 mm.

11. A fiber optic cable assembly, comprising:
    a fiber optic cable comprising a cable jacket, one or more cable strength members disposed within the cable jacket, and one or more optical fiber sub-units disposed within the cable jacket, wherein each optical fiber sub-unit includes a sub-unit jacket and a plurality of optical fibers disposed within the sub-unit jacket;
    an end portion of the fiber optic cable comprising end portions of the one or more optical fiber sub-units and end portions of the one or more cable strength members both exposed from an end portion of the cable jacket; and
    a furcation assembly receiving the end portion of the fiber optic cable at a first end of the furcation assembly, the furcation assembly terminating the end portion of the cable jacket and the end portions of the one or more cable strength members, and the end portions of the one or more optical fiber sub-units extending through and from a second end of the furcation assembly;
    the one or more cable strength members are disposed within the cable jacket in a first length, and the one or more optical fiber sub-units are disposed within the cable jacket in a second length, the second length greater than the first length;
    wherein the one or more optical fiber sub-units are disposed adjacent to the one or more cable strength members within the cable jacket allowing movement between the one or more optical fiber sub-units and the one or more cable strength members within the cable jacket.

12. The fiber optic cable assembly of claim 11, wherein the furcation assembly transfers at least a portion of tensile load placed on the furcation assembly to the one or more cable strength members.

13. A method of assembling a fiber optic cable assembly, comprising:
    disposing one or more cable strength members within a cable jacket of a fiber optic cable in a first length;
    disposing one or more optical fiber sub-units within the cable jacket in a second length, the second length greater than the first length, the one or more optical fiber sub-units each including a sub-unit jacket and a plurality of optical fibers disposed in the sub-unit jacket;
    exposing end portions of the one or more optical fiber sub-units and end portions of the one or more cable strength members from an end portion of the cable jacket;
    receiving the end portion of the fiber optic cable at a first end of a furcation assembly;
    terminating the end portion of the cable jacket and the end portions of the one or more cable strength members in the furcation assembly; and
    extending the end portions of the one or more optical fiber sub-units through the furcation assembly and from a second end of the furcation assembly
    wherein disposing the one or more optical fiber sub-units within the cable jacket in a second length comprises pushing the end portions of the one or more optical fiber sub-units into the end portion of the cable jacket.

14. The method of claim 13, further comprising not exposing each of the plurality of optical fibers disposed in the one or more optical fiber sub-units outside of the sub-unit jackets within the furcation assembly.

15. The method of claim 13, further comprising tightly buffering optical fibers within the sub-unit jacket with no strength members disposed in the sub-unit jacket.

* * * * *